(12) United States Patent
Escolero et al.

(10) Patent No.: US 12,375,272 B2
(45) Date of Patent: Jul. 29, 2025

(54) KEY ROTATION FOR DEVICE APPLICATION AUTHENTICATION

(71) Applicant: Cisco Technology, Inc., San Jose, CA (US)

(72) Inventors: Ruben Erick Escolero, San Francisco, CA (US); Michael Freed, Pleasanton, CA (US); Fiona Hall-Zazueta, San Jose, CA (US); Jason Trung Hoa Tang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 18/114,693

(22) Filed: Feb. 27, 2023

(65) Prior Publication Data

US 2024/0137220 A1 Apr. 25, 2024

Related U.S. Application Data (60) Provisional application No. 63/418,301, filed on Oct. 21, 2022.

(51) Int. Cl.
*H04L 9/00* (2022.01)
*H04L 9/08* (2006.01)

(52) U.S. Cl.
CPC .......... *H04L 9/0894* (2013.01); *H04L 9/0825* (2013.01)

(58) Field of Classification Search
CPC ............................ H04L 9/0825; H04L 9/0894
USPC ........................................................ 713/171
See application file for complete search history.

(56) References Cited

U.S. PATENT DOCUMENTS

| | | | |
|---|---|---|---|
| 8,565,422 B2 | 10/2013 | Lee et al. | |
| 10,581,820 B2 | 3/2020 | Keshava et al. | |
| 10,742,626 B2 | 8/2020 | Oberheide et al. | |
| 10,992,472 B2 | 4/2021 | Gehrmann | |
| 11,522,684 B2 | 12/2022 | Sreeravindra | |
| 2006/0143453 A1* | 6/2006 | Imamoto | H04L 9/3273 713/169 |
| 2008/0130902 A1* | 6/2008 | Foo Kune | H04L 63/065 380/286 |

(Continued)

OTHER PUBLICATIONS

Dagan, Roy, "Password Rotation Can Make or Break Your Security Posture", online: https://venturebeat.com/enterprise/password-rotation-can-make-or-break-your-security-posture/, Feb. 18, 2022, 7 pages, VentureBeat.

(Continued)

*Primary Examiner* — Josnel Jeudy
(74) *Attorney, Agent, or Firm* — Behmke Innovation Group LLC; James M. Behmke (57) ABSTRACT

In various embodiments, a server stores a set of cryptographic keys associated with a client that includes a server-stored bootstrap key, a server-stored authentication key, and a server-stored proposed key. The server receives an authentication request from the client that includes a client-indicated bootstrap key, a client-indicated authentication key, and a client-indicated proposed key. The server makes a determination that the client is authenticated based in part on whether there is a match between the client-indicated authentication key and either the server-stored authentication key or the server-stored proposed key. The server provides, based on the determination, an authentication response to the client indicating that the client has been authenticated.

20 Claims, 6 Drawing Sheets

(56) References Cited

U.S. PATENT DOCUMENTS

| | | | |
|---|---|---|---|
| 2017/0214664 A1 | | 7/2017 | Birgisson et al. |
| 2018/0191501 A1* | | 7/2018 | Lindemann ........... H04L 9/0833 |
| 2019/0306154 A1* | | 10/2019 | Girdhar ............... H04W 12/065 |
| 2019/0356482 A1 | | 11/2019 | Nix |
| 2021/0218567 A1 | | 7/2021 | Richards et al. |

OTHER PUBLICATIONS

"Key Rotation", online: https://cloud.google.com/kms/docs/key-rotation, accessed Feb. 23, 2023, 3 pages.

"Rotating AWS KMS keys", online: https://docs.aws.amazon.com/kms/latest/developerguide/rotate-keys.html, online: https://docs.aws.amazon.com/kms/latest/developerguide/rotate-keys.html, accessed Feb. 23, 2023, 10 pages.

"Rotating Keys", online: https://cloud.google.com/kms/docs/rotating-keys#kms-create-key-rotation-schedule-console, accessed Feb. 23, 2023, 10 pages.

Everspaugh, et al., "Key Rotation for Authenticated Encryption", Advances in Cryptology—CRYPTO 2017. CRYPTO 2017. Lecture Notes in Computer Science( ), vol. 10403, 37 pages, Springer, Cham.

European Search Report in European Patent Application No. 23201710.3, dated Dec. 18, 2023, 8 Pages.

\* cited by examiner

KEY ROTATION FOR DEVICE APPLICATION AUTHENTICATION

RELATED APPLICATION

This application claims priority to U.S. Provisional Application No. 63/418,301, filed on Oct. 21, 2022, entitled "KEY ROTATION FOR DEVICE APPLICATION AUTHENTICATION," by Escolero, et al., the contents of which are incorporated herein by reference.

TECHNICAL FIELD

The present disclosure relates generally to computer networks, and, more particularly, to key rotation for device application authentication.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

With the wide variety of IoT devices and deployment scenarios, key rotation is an important first line of defense for IoT devices. Despite this, many to IoT devices are still shipped with default credentials that are never rotated, leaving the door open for malicious actors to compromise them. In addition, default or bootstrap credentials are typically not encrypted or secured since they are meant to be used for one-time setup of the IoT device (e.g., to connect it to a cloud server). When these credentials are then kept after setup as the only key for the IoT device, anyone else who knows the common bootstrap value could gain full access to the IoT device, as well as potentially compromise its corresponding server.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server stores a set of cryptographic keys associated with a client that includes a server-stored bootstrap key, a server-stored authentication key, and a server-stored proposed key. The server receives an authentication request from the client that includes a client-indicated bootstrap key, a client-indicated authentication key, and a client-indicated proposed key. The server makes a determination that the client is authenticated based in part on whether there is a match between the client-indicated authentication key and either the server-stored authentication key or the server-stored proposed key. The server provides, based on the determination, an authentication response to the client indicating that the client has been authenticated.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
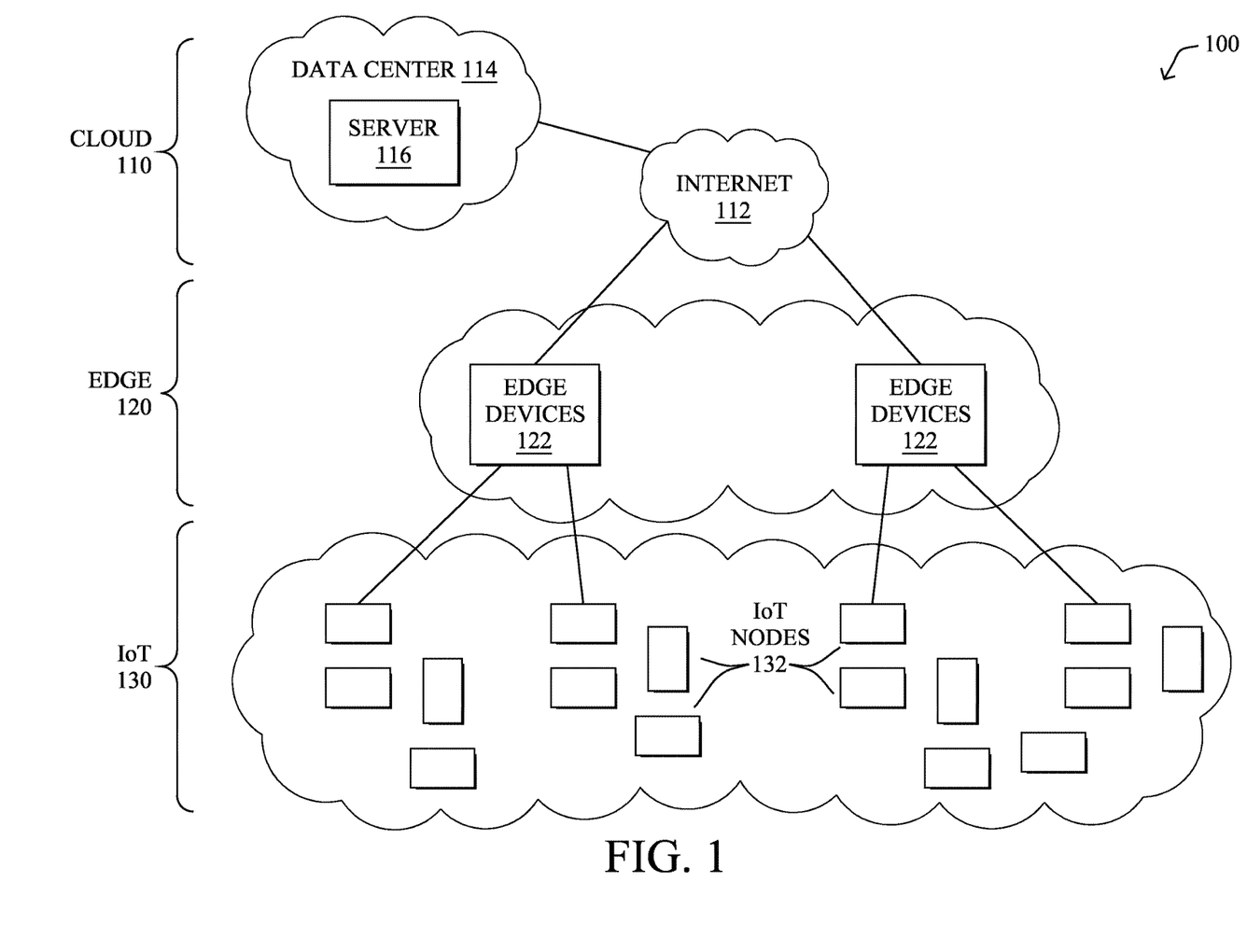
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
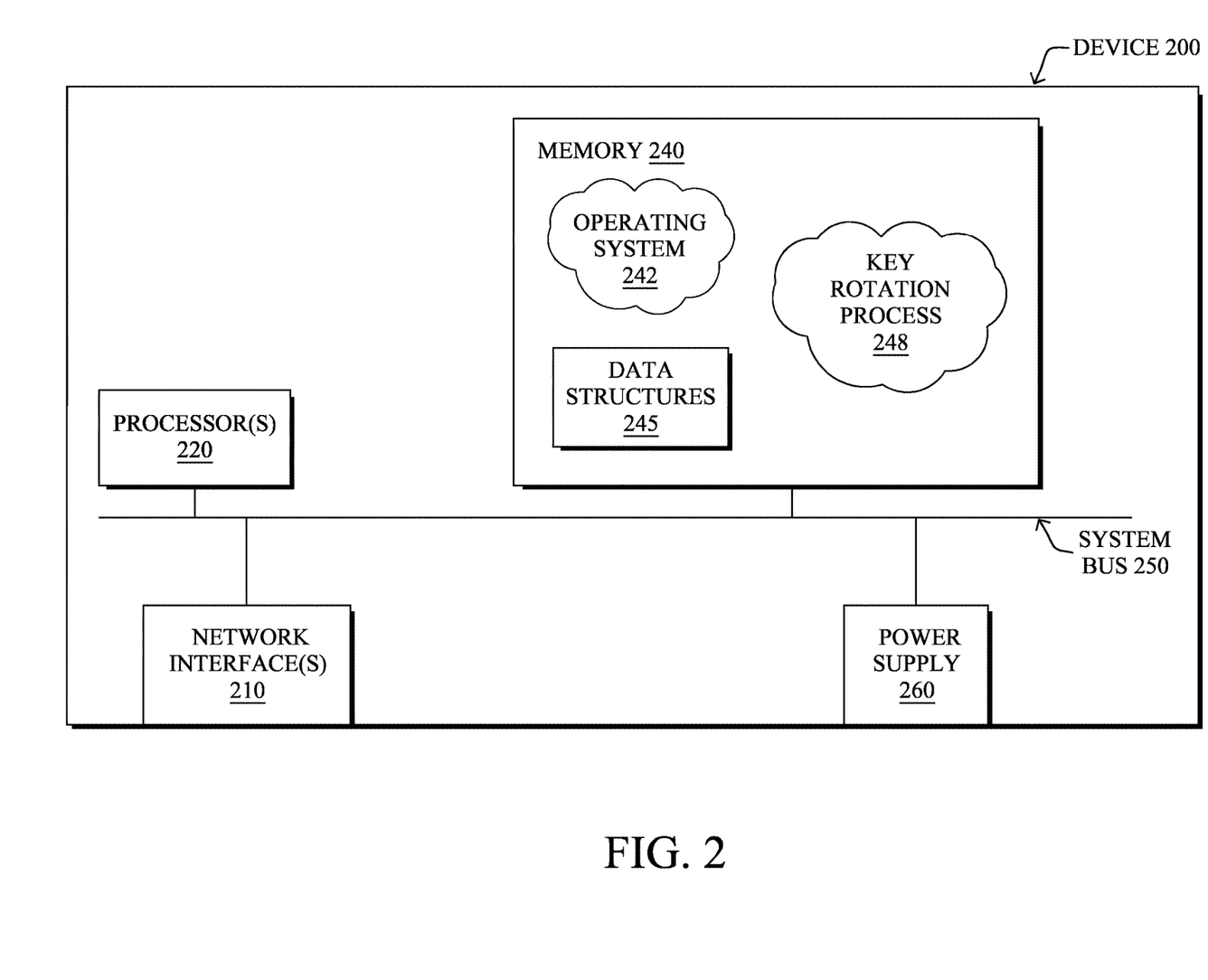
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative key rotation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many IoT devices today are sold with default or bootstrap credentials that are not encrypted or secured. These credentials are used to setup the device and, typically, connect the IoT device to a remote service/server. For instance, consider the case of a temperature sensor being deployed to a particular building. As part of its onboarding/bootstrapping procedure, it may use its default credentials to register itself with a cloud-hosted service that allows the operator of the building to monitor the environmental conditions of their building.

While configuring an IoT device with default credentials is itself not a security concern, this only remains true if the credentials are not reused over a long period of time. Otherwise, the credentials could be obtained by a malicious actor, thereby exposing the IoT device (and potentially its corresponding server) to unwanted access. Thus, key rotation is an important mechanism to protect IoT systems from hackers and other malicious actors.

According to the techniques herein, in an IoT system with a cloud service and multiple IoT devices that use bootstrap configurations to authenticate and identify themselves during onboarding, any key rotation solution should satisfy any or all of the following:

Key Security—Any keys used must be stored in a secure manner. In addition, sever certificates must also be validated and a secure transport mechanism should be used, such as Transport Layer Security (TLS) or other secure communication protocol.

Key Recovery—Any client IoT device should have the ability to synchronize a key with the cloud service, if the two become out of sync.

Backwards Compatibility—As there are already millions of IoT devices already deployed, any solution should also ideally accommodate those devices that do not support key rotation.

Simplicity—The key rotation mechanism should also be as simple as possible and not add complexity in the form of new messages or protocols.

Key Protocol—The key rotation mechanism should also support both symmetric and asymmetric keying. When asymmetric keying is used, the private key must never leave device, to ensure the security of the IoT device.

Key Rotation for Device Application Authentication

The techniques herein introduce a key rotation mechanism for IoT and other devices for purposes of identifying themselves to remote applications/services. In some aspects, key rotation is performed alongside authentication of the IoT device, preferably using the same message. To do so, a combination of three keys are proposed, which also allows for recovery when the IoT device and the application/service become out of sync.

Illustratively, the techniques described herein may be performed by hardware, software, and/or firmware, such as in accordance with key rotation process 248, which may include computer executable instructions executed by the processor 220 (or independent processor of interfaces 210) to perform functions relating to the techniques described herein.

Specifically, in various embodiments, a server stores a set of cryptographic keys associated with a client that includes a server-stored bootstrap key, a server-stored authentication key, and a server-stored proposed key. The server receives an authentication request from the client that includes a client-indicated bootstrap key, a client-indicated authentication key, and a client-indicated proposed key. The server makes a determination that the client is authenticated based in part on whether there is a match between the client-indicated authentication key and either the server-stored authentication key or the server-stored proposed key. The server provides, based on the determination, an authentication response to the client indicating that the client has been authenticated.

According to various embodiments, by combining device authentication and key rotation operations, increased reliability can be obtained with a reduction in the overall number of messages shared between an IoT device and a cloud server (e.g., in a simplified version of a two-phase commit). In some embodiments, the techniques herein propose the use of the following three keys that are used in the combined authentication and key rotation operation:

1. The Bootstrap key is the first key used to authenticate the IoT device. In some embodiments, this key originates from the server (e.g., a server that provides a cloud application) and is saved to the client IoT device.
2. The Authentication key is the currently active key during rotation.
3. The Proposed key is the new key that is being rotated into use, and will become the Authentication key.

Through the use of these three keys, it will also be possible to easily perform key recovery when the server and the client device keys become out of sync. As detailed further below, this key recovery operation is a one-time process that may be initiated by the server and no information is lost, as a result.

Figure 3:
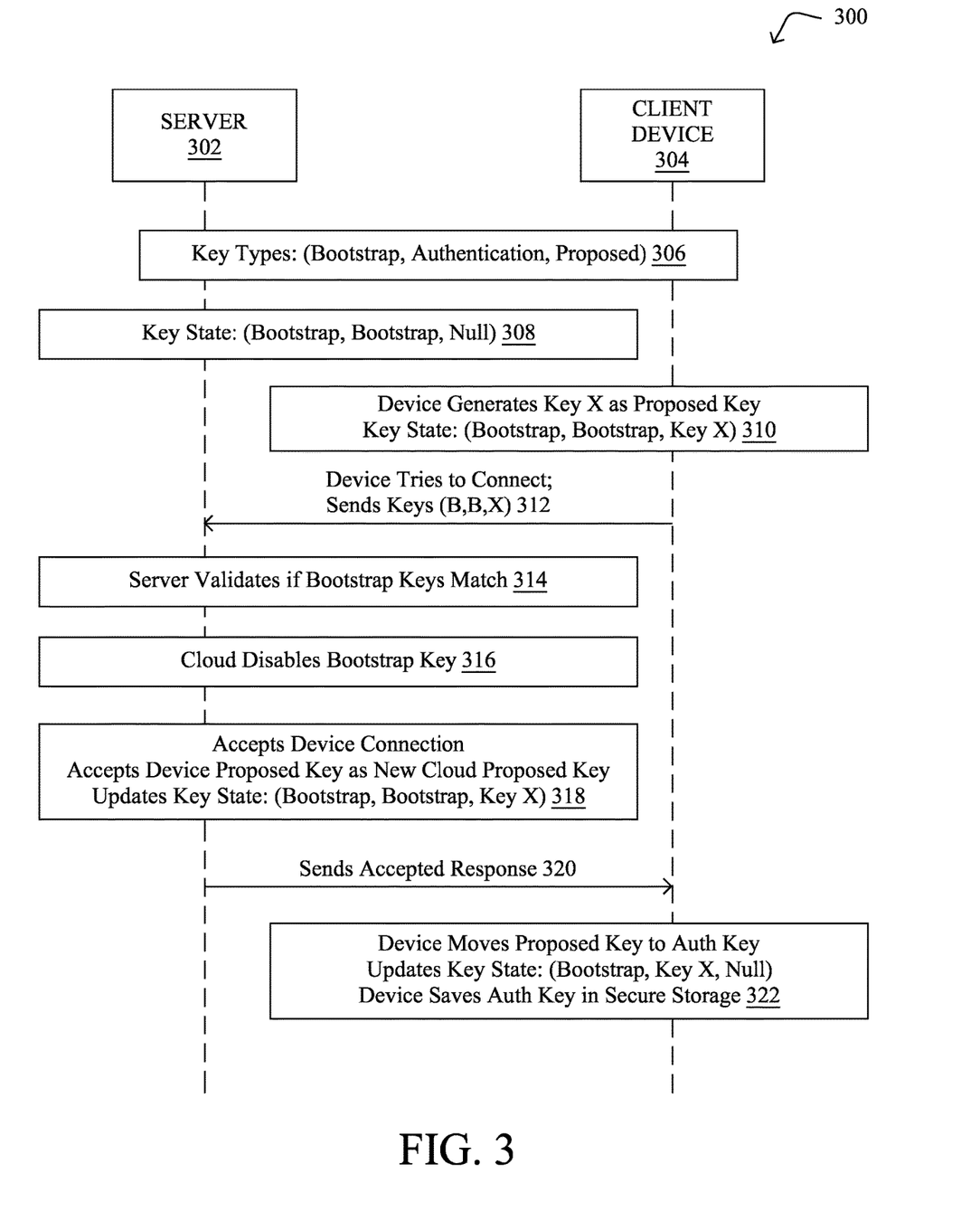
FIG. 3 illustrates an example flow diagram of an initial key rotation between a client device and a cloud service.

FIG. 3 illustrates an example flow diagram 300 of an initial key rotation between a server 302 and a client device 304, according to various embodiments. As shown, and in various embodiments, server 302 (e.g., a server that provides a cloud-hosted service, a server in a data center, etc.) and client device 304 (e.g., an IoT device) may each utilize the three keys types above: Bootstrap, Authentication, and Proposed. For purposes of differentiating the cryptographic keys stored by server 302 and client device 304 at any given time, "server-stored" keys refer to the Bootstrap, Authentication, and Proposed keys stored by server 302, whereas "client-indicated" keys refer to the Bootstrap, Authentication, and Proposed keys stored by client device 304 and sent to server 302 as part of a request.

Initially, at step 306, server 302 maintains and stores a Bootstrap key and sets its Authentication key to the value of the Bootstrap key. Similarly, client device 304 may also be pre-configured with the same Bootstrap key, such as part of its manufacturing process. Since client device 304 has not yet contacted server 302 at this point in time, at step 308, server 302 may set its Proposed key state to null or any other suitable value, and be in a bootstrap initialization mode with respect to client device 304.

At step 310, once client device 304 is ready to begin connecting to server 302 (e.g., after being deployed to a physical location), it may generate a new key 'X' as its Proposed key. In turn, at step 312, server 302 may send all three of its client-specified keys as part of a message to server 302: the Bootstrap key, the Authentication key set to the value of the Bootstrap key, and the Proposed key that it generated.

At step 314, in response to the connection message from client device 304, server 302 may validate the Bootstrap and Authentication keys, to ensure that they match (e.g., that either or both values match that of the server-stored Bootstrap key). In turn, if there is a match, at step 316, server 302 may then exit its bootstrap initialization model with respect to client device 304 by disabling the Bootstrap key from again being used in this manner.

At step 318, server 302 may then accept the Proposed key as the new server-stored Proposed key, thereby updating its Proposed key value from 'null' (or other default value) to that of the client-specified Proposed key sent by client device 304. Then, at step 320, server 302 may notify client device 304 that it has accepted the Proposed key.

Now that server 302 has accepted the client-specified Proposed key, at step 322, client device 304 may then update its key states by setting the value of its Authentication key to that of the Proposed key accepted by server 302. Client device 304 may then use the Authentication key to authenticate itself to server 302, the next time that it logs into the service provided by server 302.

In addition, client device 304 may also reset its Proposed key value to a default value, such as 'null.' Preferably, client device 304 will save the Authentication key in a secure storage (e.g., encrypted storage, etc.), thereby preventing malicious entities that have physical access to the device from obtaining the keys.

Figure 4:
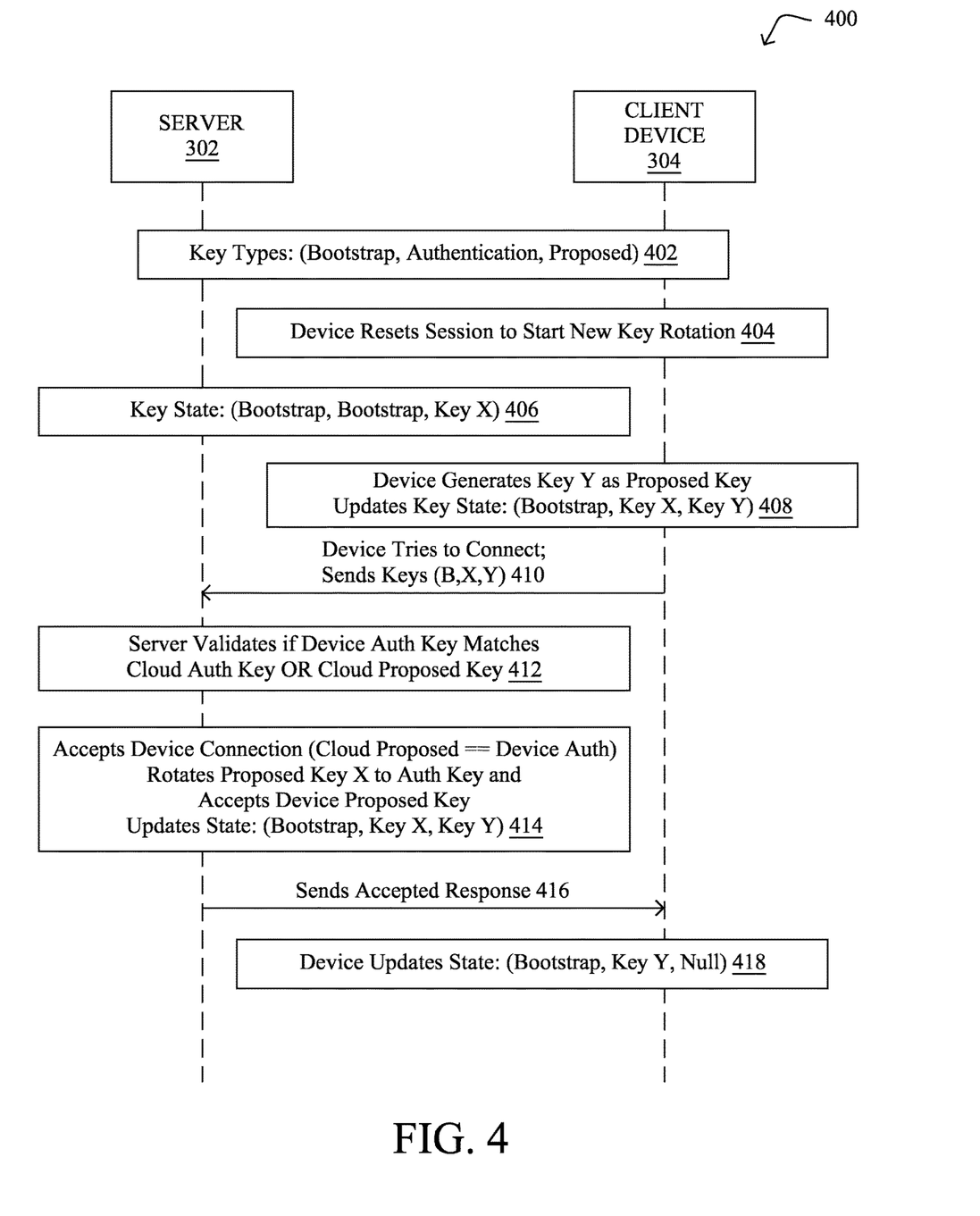
FIG. 4 illustrates an example flow diagram of a key rotation triggered by the client device.

FIG. 4 illustrates an example flow diagram 400 of a key rotation triggered by client device 304, according to various embodiments. Continuing the example of FIG. 3, assume now that server 302 and client device 304 have completed the initial bootstrapping exchange and client device 304 is to begin using its cryptographic keys to authenticate itself to the service/application of server 302. During this authentication, the set of keys may be rotated, so as to provide additional security going forward between server 302 and client device 304. In some embodiments, this key rotation may be initiated by client device 304 by proposing a new key (i.e., a new Proposed key value). Preferably, it may do so as part of its authentication request to server 302, in one embodiment.

More specifically, as shown in FIG. 4 at step 402, assume that server 302 and client device 304 each maintains its own set of Bootstrap, Authentication, and Proposed keys. Here, if they've already performed an initial exchange, such as the one shown in FIG. 3, at step 406, the current key state for the Proposed Key will be the value 'X,' which was the value of the most recent client-indicated Proposed key sent by client device 304 to server 302. Thus, as shown in step 406, the current state at server 302 will be the Bootstrap key, the Authentication key set to the value of the Bootstrap key, and the Proposed key set to 'X. In various embodiments, server 302 may update its proposed key upon determining that client device 304 is authenticated, in response to step 404 during which client device 304 resets its connection with server 302, or at any other time.

At step 408, after resetting its connection with server 302 at step 404, server 302 may then initiate a new key rotation. To do so, at step 408, it may then generate a new Proposed key with a value of 'Y.' In turn, at step 410, client device 304 may then send an authentication request to server 302 that includes its three client-specified keys: the Bootstrap key, an Authentication key set to the value 'X' (e.g., the previously proposed key that was accepted by server 302), and a Proposed key set to the newly generated value 'Y.'

In various embodiments, at step 412, server 302 may authenticate client device 304 if either or both of the following conditions are met:

The client-specified Authentication key sent by client device 304 matches the server-stored Authentication key stored by server 302; and/or The client-specified Authentication key sent by client device 304 matches the server-stored Proposed key stored by server 302.

If either of the above conditions are met, server 302 may also accept the client-specified Proposed key (e.g., in conjunction with also authenticating client device 304).

In such a case, at step 414, server 302 may set the value of its stored Proposed key to that of the Proposed key sent by client device 304 (i.e., 'Y'), as well as set the value of its stored Authentication key to the value of its previously stored Proposed key (i.e., 'X').

Then, at step 416, server 302 sends an acceptance response back to client device 304. In turn, at step 418, client device 304 updates the state of its keys by setting the value of its Authentication key to that of the Proposed key that was accepted by server 302 (i.e., 'Y'), and may return the value of its Proposed key to a default value. Client device 304 can then use the Authentication key value in its next authentication request to server 302.

Figure 5:
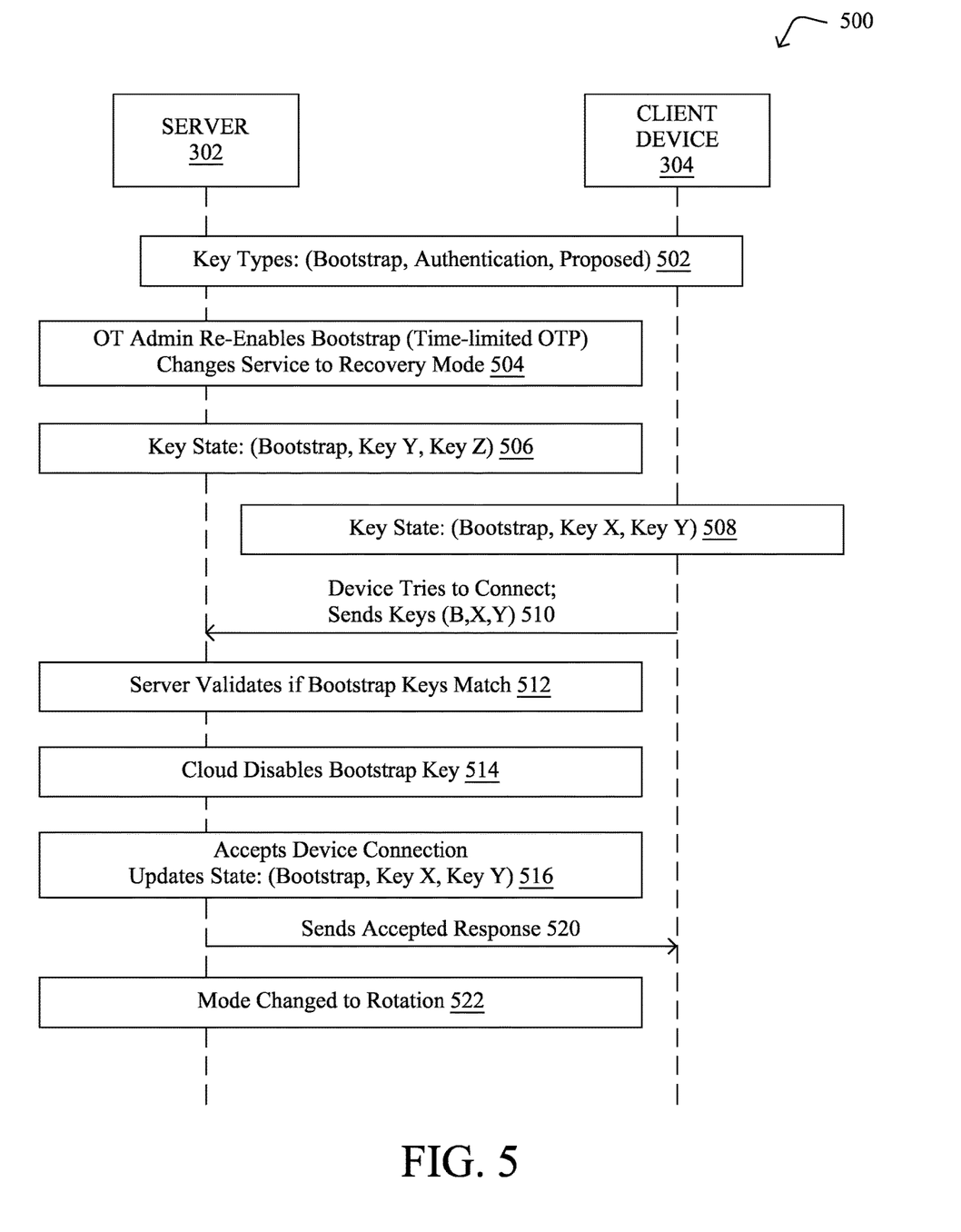
FIG. 5 illustrates an example flow diagram of key recovery between the client device and the cloud service.

According to various embodiments, the techniques introduced herein also allows for recovery, such client device 304 and server 302 become out of sync. For instance, FIG. 5 illustrates an example flow diagram of 500 key recovery between client device 304 and server 302, in some embodiments. Continuing the above examples, now assume that client device 304 and server 302 are no longer synchronized with one another in terms of their cryptographic keys. As with the above, at step 502, each of server 302 and client device 304 may maintain their own set of the three types of cryptographic keys. However, this time, assume that there is a lack of synchronization for whatever reason.

In such a case, at step 504, server 302 may receive an instruction from an administrator (e.g., via a user interface) to re-enable the bootstrapping process in recovery mode (i.e., enter into a recover mode of operation). Generally, the recovery mode is a specialized mode of operation that allows client device 304 to resynchronize its keys with that of server 302 though limited use of the Bootstrap key.

In response to entering its recovery mode, at step 506, server 302 may generate a one-time pad (OTP) that may also be time-limited, having a value of 'Z.' In turn, server 302 may set its stored Proposed key to the value 'Z' and send it to client device 304 for use as its new Bootstrap key. Alternative, if this is impractical (e.g., due to a network issue, etc.), server 302 may temporarily re-enable the old Bootstrap key, allowing client device 304 to authenticate itself again using the old Bootstrap key, in one embodiment.

Now, at step 508, assume that client device 304 has lost its key synchronization with that of server 302 and currently has its Bootstrap key, its Authentication key set to a value of 'X,' and its Proposed key set to a value of 'Y.' In such a case, at step 520, it may send an authentication request to server 302 with these keys.

In various embodiments, at step 512, server 302 may then validate whether the client-indicated Bootstrap key sent by client device 304 matches its stored Bootstrap key and, if so, accepts the connection request and authenticates client device 304. In other words, while in its recovery mode of operation, server 302 may still determine that client device 304 is authenticated, so long as the client-specified Bootstrap key from client device 304 matches the server-stored Bootstrap key of server 302. Of course, if they do not match, server 302 may determine that no authentication exists and simply ignore or reject the authentication request, similar to how it may with any other incoming authentication request.

If client device 304 is authenticated, at step 514, server 302 may then again disable the server-stored Bootstrap key. In addition, at step 516, server 302 may update the state of its keys (e.g., by setting the server-stored Authentication key to 'X,' and the Proposed key to 'Y') and, at step 520, send an acceptance response back to client device 304. Once this is done, server 302 may then revert back to its normal key rotation mode of operation, as exemplified in FIG. 4.

Figure 6:
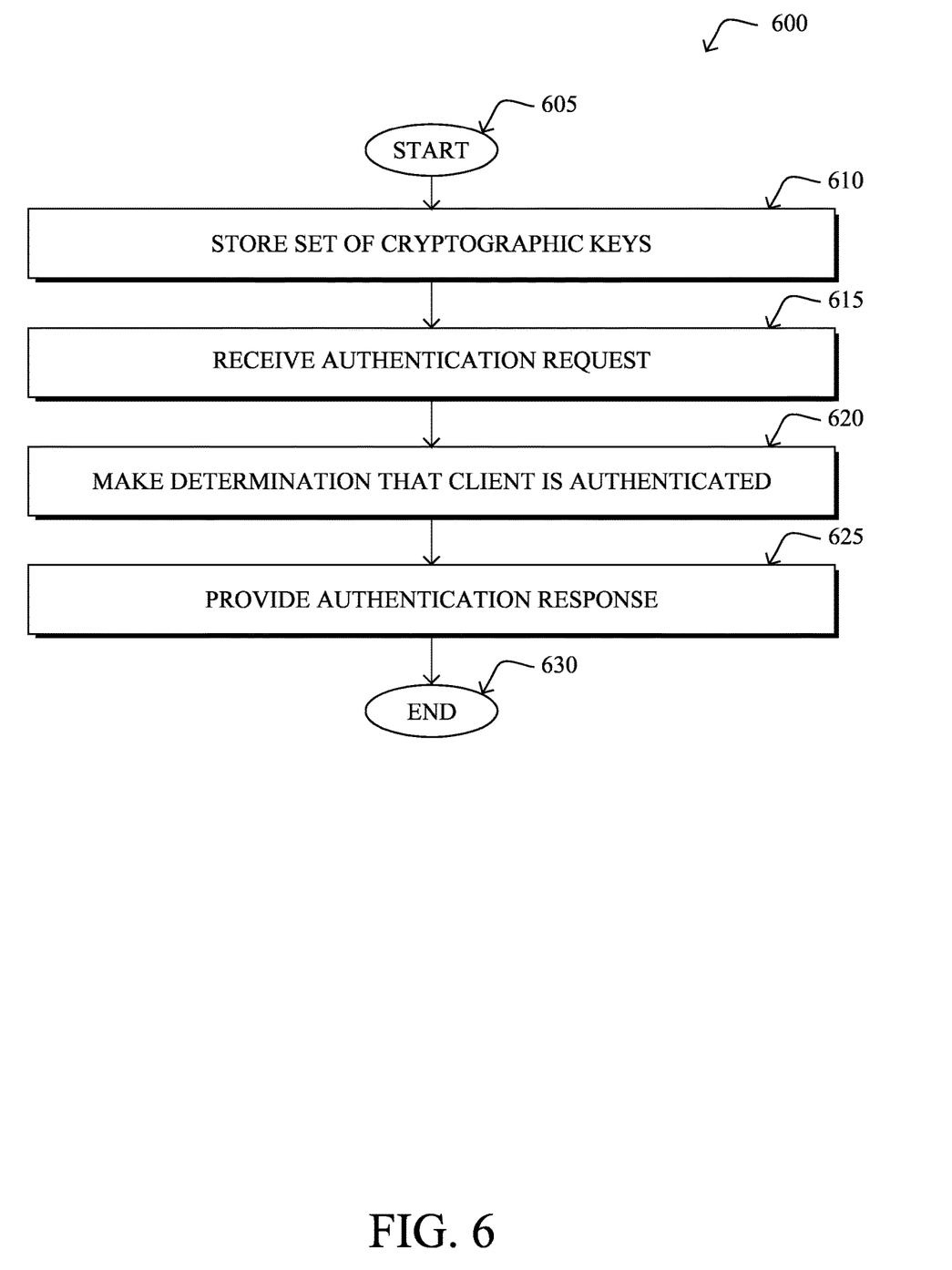
FIG. 6 illustrates an example simplified procedure for key rotation for device application authentication.

FIG. 6 illustrates an example simplified procedure 600 (e.g., a method) for key rotation for device application authentication, in accordance with one or more embodiments described herein. For example, a non-generic, specifically configured device (e.g., device 200), such as a server or other apparatus, may perform procedure 600 by executing stored instructions (e.g., application experience optimization process 248). The procedure 600 may start at step 605, and continues to step 610, where, as described in greater detail above, the server may store a set of cryptographic keys associated with a client that includes a server-stored bootstrap key, a server-stored authentication key, and a server-stored proposed key. In various embodiments, the client comprises a sensor or an actuator.

At step 615, as detailed above, the server may receive an authentication request from the client that includes a client-indicated bootstrap key, a client-indicated authentication key, and a client-indicated proposed key. In some embodiments, the server may also receive, while in a bootstrap initialization mode of the server, an initial authentication request from the client that includes the client-indicated bootstrap key and an initial client-indicated proposed key. In turn, the server may set the server-stored proposed key to the initial client-indicated proposed key, based on the client-indicated bootstrap key in the initial authentication request matching the server-stored bootstrap key. In another embodiment, the server may exit the bootstrap initialization mode, when the client-indicated bootstrap key in the initial authentication request matching the server-stored bootstrap key, whereby the server does not compare the server-stored bootstrap key to any client-indicated bootstrap key when the server is not in the bootstrap initialization mode.

At step 620, the server may make a determination that the client is authenticated based in part on whether there is a match between the client-indicated authentication key and either the server-stored authentication key or the server-stored proposed key, as described in greater detail above. In one embodiment, the server may set the server-stored proposed key to the client-indicated proposed key, when the client-indicated authentication key matches the server-stored authentication key. In further embodiments, the server may set the server-stored authentication key to the client-indicated proposed key, when the client-indicated authentication key matches the server-stored proposed key, and set the server-stored proposed key to be null, when the client-indicated authentication key matches the server-stored proposed key.

At step 625, as detailed above, the server may provide, and based on the determination, an authentication response to the client indicating that the client has been authenticated. In various embodiments, the client sets its client-indicated authentication key to the client-indicated proposed key, in response to the authentication response. In an additional embodiment, the server may enter a recovery mode, in response to a request to do so from a user interface, whereby the server makes the determination that the client is authenticated when the client-indicated bootstrap key matches the server-stored bootstrap key and while in its recovery mode. In a further embodiment, the server may set, while in its recovery mode, the server-stored authentication key to the client-indicated authentication key and the server-stored proposed key to the client-indicated proposed key. The server may then exit the recovery mode after making the determination that the client is authenticated.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for key rotation for device application authentication, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   storing, by a server, a set of cryptographic keys associated with a client that includes a server-stored bootstrap key, a server-stored authentication key, and a server-stored proposed key;
   receiving, at the server, an authentication request from the client that includes a client-indicated bootstrap key, a client-indicated authentication key, and a client-indicated proposed key;
   making, by the server, a determination that the client is authenticated based in part on whether there is a match between the client-indicated authentication key and either the server-stored authentication key or the server-stored proposed key; and
   providing, by the server and based on the determination, an authentication response to the client indicating that the client has been authenticated.

2. The method as in claim 1, wherein the client sets its client-indicated authentication key to the client-indicated proposed key, in response to the authentication response.

3. The method as in claim 1, further comprising:
   setting, by the server, the server-stored proposed key to the client-indicated proposed key, when the client-indicated authentication key matches the server-stored authentication key.

4. The method as in claim 1, further comprising:
   setting, by the server, the server-stored authentication key to the client-indicated proposed key, when the client-indicated authentication key matches the server-stored proposed key; and
   setting, by the server, the server-stored proposed key to be null, when the client-indicated authentication key matches the server-stored proposed key.

5. The method as in claim 1, further comprising:
   entering a recovery mode of the server, in response to a request to do so from a user interface, wherein the server makes the determination that the client is authenticated when the client-indicated bootstrap key matches the server-stored bootstrap key and while in its recovery mode.

6. The method as in claim 5, further comprising:
   setting, by the server and while in its recovery mode, the server-stored authentication key to the client-indicated authentication key and the server-stored proposed key to the client-indicated proposed key.

7. The method as in claim 5, further comprising:
   exiting the recovery mode after making the determination that the client is authenticated.

8. The method as in claim 1, further comprising:
   receiving, at the server and while in a bootstrap initialization mode of the server, an initial authentication request from the client that includes the client-indicated bootstrap key and an initial client-indicated proposed key; and
   setting, by the server, the server-stored proposed key to the initial client-indicated proposed key, based on the client-indicated bootstrap key in the initial authentication request matching the server-stored bootstrap key.

9. The method as in claim 8, further comprising:
   exiting the bootstrap initialization mode, when the client-indicated bootstrap key in the initial authentication request matching the server-stored bootstrap key, wherein the server does not compare the server-stored bootstrap key to any client-indicated bootstrap key when the server is not in the bootstrap initialization mode.

10. The method as in claim 1, wherein the client comprises a sensor or an actuator.

11. An apparatus, comprising:
    one or more network interfaces;
    a processor coupled to the one or more network interfaces and configured to execute one or more processes; and
    a memory configured to store a process that is executable by the processor, the process when executed configured to:
      store a set of cryptographic keys associated with a client that includes a server-stored bootstrap key, a server-stored authentication key, and a server-stored proposed key;
      receive an authentication request from the client that includes a client-indicated bootstrap key, a client-indicated authentication key, and a client-indicated proposed key;
      make a determination that the client is authenticated based in part on whether there is a match between the client-indicated authentication key and either the server-stored authentication key or the server-stored proposed key; and
      provide, and based on the determination, an authentication response to the client indicating that the client has been authenticated.

12. The apparatus as in claim 11, wherein the client sets its client-indicated authentication key to the client-indicated proposed key, in response to the authentication response.

13. The apparatus as in claim 11, wherein the process when executed is further configured to:
    set the server-stored proposed key to the client-indicated proposed key, when the client-indicated authentication key matches the server-stored authentication key.

14. The apparatus as in claim 11, wherein the process when executed is further configured to:
    set the server-stored authentication key to the client-indicated proposed key, when the client-indicated authentication key matches the server-stored proposed key; and
    set the server-stored proposed key to be null, when the client-indicated authentication key matches the server-stored proposed key.

15. The apparatus as in claim 11, wherein the process when executed is further configured to:
    enter a recovery mode, in response to a request to do so from a user interface, wherein the apparatus makes the determination that the client is authenticated when the client-indicated bootstrap key matches the server-stored bootstrap key and while in its recovery mode.

16. The apparatus as in claim 15, wherein the process when executed is further configured to:
    set, by the apparatus and while in its recovery mode, the server-stored authentication key to the client-indicated authentication key and the server-stored proposed key to the client-indicated proposed key.

17. The apparatus as in claim 15, wherein the process when executed is further configured to:
  exit the recovery mode after making the determination that the client is authenticated.

18. The apparatus as in claim 11, wherein the process when executed is further configured to:
  receive, while in a bootstrap initialization mode of the apparatus, an initial authentication request from the client that includes the client-indicated bootstrap key and an initial client-indicated proposed key; and
  set the server-stored proposed key to the initial client-indicated proposed key, based on the client-indicated bootstrap key in the initial authentication request matching the server-stored bootstrap key.

19. The apparatus as in claim 18, wherein the process when executed is further configured to:
  exit the bootstrap initialization mode, when the client-indicated bootstrap key in the initial authentication request matching the server-stored bootstrap key, wherein the apparatus does not compare the server-stored bootstrap key to any client-indicated bootstrap key when not in the bootstrap initialization mode.

20. A tangible, non-transitory, computer-readable medium storing program instructions that cause a server to execute a process comprising:
  storing, by a server, a set of cryptographic keys associated with a client that includes a server-stored bootstrap key, a server-stored authentication key, and a server-stored proposed key;
  receiving, at the server, an authentication request from the client that includes a client-indicated bootstrap key, a client-indicated authentication key, and a client-indicated proposed key;
  making, by the server, a determination that the client is authenticated based in part on whether there is a match between the client-indicated authentication key and either the server-stored authentication key or the server-stored proposed key; and
  providing, by the server and based on the determination, an authentication response to the client indicating that the client has been authenticated.

* * * * *